United States Patent [19]

Schuder et al.

[11] Patent Number: 5,259,777
[45] Date of Patent: Nov. 9, 1993

[54] SET OF CONTACT ELEMENTS FOR CONTACTING THE CONTACT ZONES OF CARDS

[75] Inventors: Bernd Schuder, Schwaigern; Robert Bleier, Untergruppenbach, both of Fed. Rep. of Germany

[73] Assignee: Amphenol-Tuchel Electronics GmbH, Fed. Rep. of Germany

[21] Appl. No.: 894,331

[22] Filed: Jun. 4, 1992

[30] Foreign Application Priority Data

Jun. 4, 1991 [DE] Fed. Rep. of Germany ....... 4118312

[51] Int. Cl.⁵ ............................................. H01R 29/00
[52] U.S. Cl. .................................. 439/188; 200/51.1; 439/260; 439/630
[58] Field of Search ....................... 439/65, 74, 76, 92, 439/108, 188, 260, 630; 200/51.09, 51.1, 51.12

[56] References Cited

U.S. PATENT DOCUMENTS

| | | | |
|---|---|---|---|
| 3,917,372 | 11/1975 | Selinko | 339/75 M |
| 4,236,667 | 12/1980 | Crowley et al. | 235/443 |
| 4,288,140 | 9/1981 | Griffith et al. | 339/74 R |
| 4,575,703 | 3/1986 | Shishido | 235/479 |
| 4,717,817 | 1/1988 | Grassl et al. | 235/441 |
| 4,724,310 | 2/1988 | Shimamura et al. | 235/483 |
| 4,734,567 | 3/1988 | Hansbauer | 235/482 |
| 4,735,578 | 4/1988 | Reichardt et al. | 439/152 |
| 4,752,234 | 6/1988 | Reichardt et al. | 439/260 |
| 4,770,639 | 9/1988 | Lau | 439/61 |
| 4,795,897 | 1/1989 | Chalendard | 235/482 |
| 4,799,891 | 1/1989 | Reichardt et al. | 439/43 |
| 4,814,593 | 3/1989 | Reichardt et al. | 235/482 |
| 4,850,888 | 7/1989 | Denlinger | 439/188 |
| 4,900,273 | 2/1990 | Pernet | 439/630 |
| 4,932,889 | 6/1990 | Bleier et al. | 439/260 |
| 4,971,568 | 11/1990 | Cronin | 439/188 |
| 4,975,086 | 12/1990 | Reichardt et al. | 439/629 |
| 4,976,630 | 12/1990 | Schuder et al. | 439/260 |
| 5,013,255 | 5/1992 | Juret et al. | 439/188 |

FOREIGN PATENT DOCUMENTS

| | | |
|---|---|---|
| 0214478 | 3/1987 | European Pat. Off. . |
| 0254316 | 1/1988 | European Pat. Off. . |
| 274534 | 7/1988 | European Pat. Off. . |
| 0351103 | 1/1990 | European Pat. Off. . |
| 0384580 | 8/1990 | European Pat. Off. . |
| 4111049 | 10/1991 | Fed. Rep. of Germany . |
| 2228633 | 8/1990 | United Kingdom . |

Primary Examiner—Paula A. Bradley
Attorney, Agent, or Firm—Bacon & Thomas

[57] ABSTRACT

A set of contact elements for use with a card comprising contact zones, including an insulating body having an upper surface and a bottom surface, reading contact elements inserted into the insulating body and extending with the contact regions beyond the upper surface of the insulating body, and at least one additional contact element located adjacent to one of the reading contact elements so as to form together therewith a card presence switch.

19 Claims, 3 Drawing Sheets

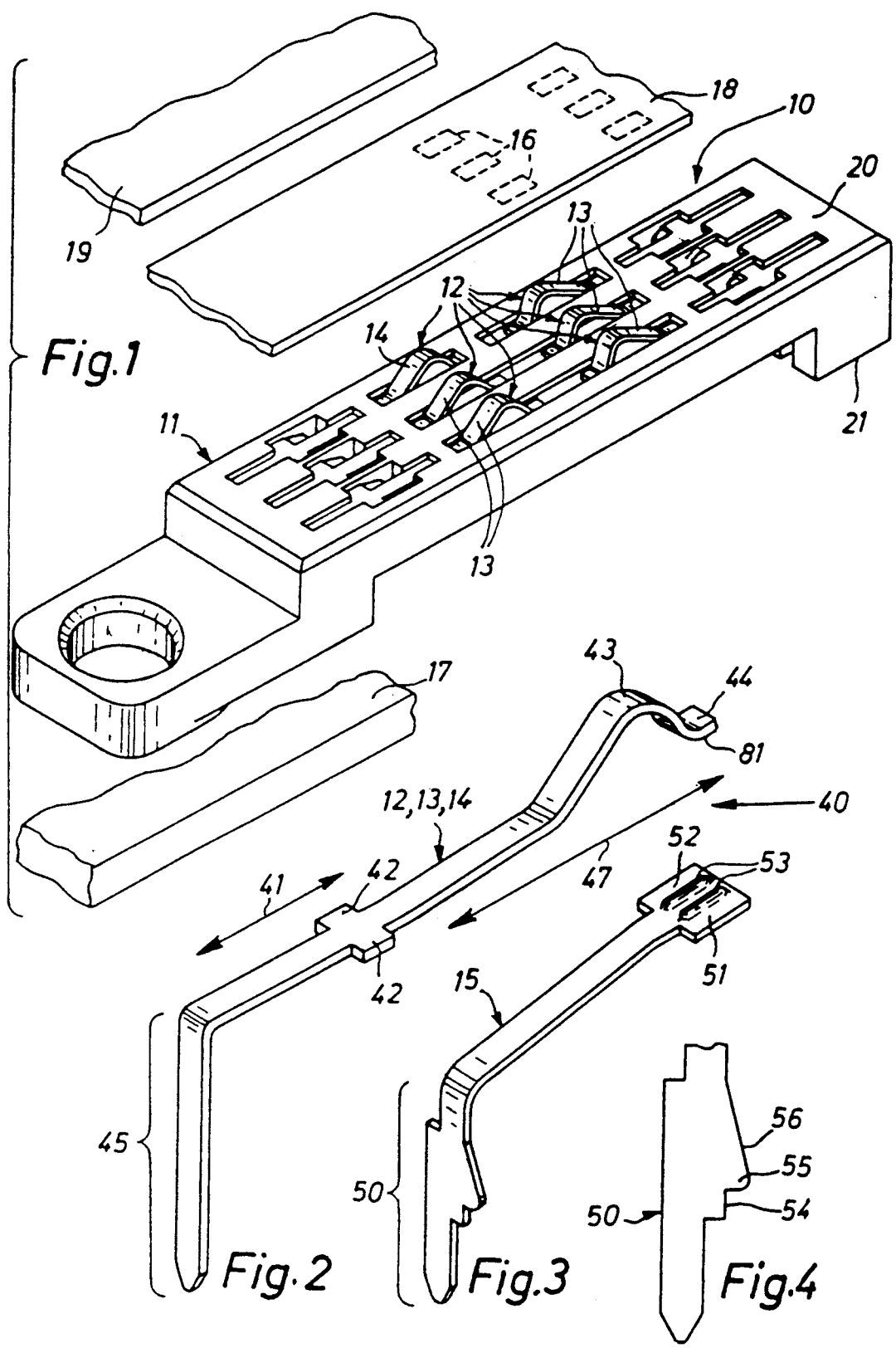

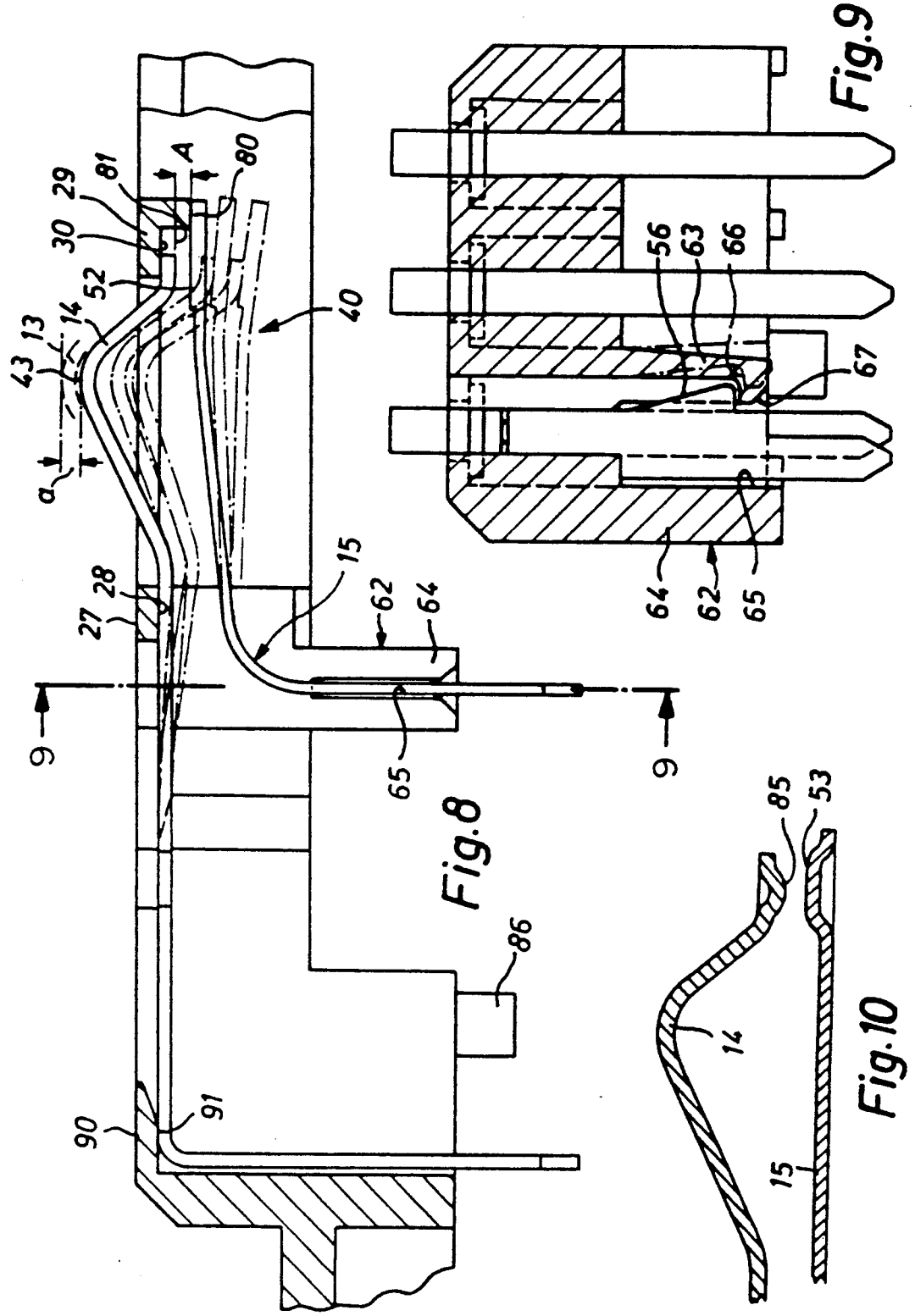

SET OF CONTACT ELEMENTS FOR CONTACTING THE CONTACT ZONES OF CARDS

TECHNICAL FIELD

This invention relates to a set of contact elements comprising an insulating body in which contact elements are supported. This set of contact elements is particularly useful together with cards having contact zones, i.e. card contacts. Examples of such cards are the so-called "chip cards" and SIM-cards. SIM stands for "Subscriber Identity Module".

The present invention relates in particular to a set of contact elements of a design according to which the SIM-card is placed in the proper position on the contact elements of the set of contact elements. Thus, the SIM- or chip-card is pressed against the contact elements by another component, for instance the cover of an apparatus within which the set of contact elements is located and within which said card is used. For reasons of simplicity reference will be made to a SIM-card even though the invention is also applicable to other types of cards having contact zones. It is noted, that with the set of contact elements of the design just described, the card is preferably not inserted by a sliding movement into the apparatus within which the set of contact elements is used when providing for the contacting operation between the card contacts and the contact elements.

More specifically, the present invention relates to a set of contact elements comprising an insulating body having contact chambers, into which a number of contact elements forming so-called reading contact elements, are inserted. A reading contact element is a contact element (short: "reading contact") by means of which information stored in the SIM-card is read. Preferably, one of the reading contacts is used as a ground contact element, i.e. a contact element designated to be connected to ground.

During use of a set of contact elements it is frequently important to deliver to the circuit cooperating with the set of contact elements information about whether and when a contacting operation occurs between the reading contact elements and the contact zones of the SIM-card.

BACKGROUND ART

DE-3832588 A1 relates to a set of contact elements which is particularly useful for contacting chip-cards. DE-3602668 relates to a contacting apparatus for a chip-card, and DE-3931506 A1 relates to another chip-card reader. For known chip-card readers the insertion of the chip-card occurs by a sliding movement. An end position switch is used to provide information about the fact that the chip-card has reached its end or reading position. The end position switch is activated by the card itself.

SUMMARY OF THE INVENTION

An object of the present invention is to provide a card presence switch for a set of contact elements such, that it is not necessary to increase the outer dimensions of the set of contact elements.

A further object is to provide a card presence switch for an already existing set of contact elements such, that the set of contact elements does not need to be increased particularly as far as its outer dimensions are concerned.

It is a still further object of the invention to provide a set of contact elements with a switch for a CCAD (Chip-Card Acceptor Device).

It is a still further object of the invention to design the card presence switch such, that the switch provides for a delayed or lagging operation, i.e. only after the reading contacts are in contact with the contact zones of the SIM-card, the card presence switch should be actuated, thus indicating that the card is in its proper reading position.

It is another object of the present invention to avoid an additional pair of contact elements when realizing a card presence switch.

In accordance with the present invention an additional contact element (ACE) is provided which is preferably assigned to cooperate with one of the reading contact elements. Preferably the additional contact element (ACE) is assigned to a reading contact element which is connected to ground, i.e. to the so-called ground contact element (GCE). The ground (GND) contact element and the additional contact element together form the card presence switch. Preferably, the card presence switch is designed as a so-called "closing switch", i.e. a switch which, when actuated by the SIM-card is switched into its closing position.

In accordance with a preferred embodiment of the invention, the additional contact element (ACE) is arranged below the GND (ground) contact element.

To provide for a lagging actuation of the card presence switch and the contact engagement between the contact zones of the SIM-card and the reading contact elements, the ground contact element is elevationally offset with respect to the reading contacts. Preferably, a gap is provided between the ground contact element and the additional contact element (ACE).

Preferably, the additional (or switching) contact element is located in the contact element chamber of the ground contact element. Preferably, an additional support dome is provided within which the additional contact element is held by snapping action.

In accordance with a preferred embodiment of the invention the additional contact element and/or the ground contact element is provided with a corrugation (seam). Preferably, crossing corrugations are used for the additional contact element and the ground contact element, respectively, such that a point contact is obtained guaranteeing a secure switching operation. The set of contact elements of the invention does not require any additional space and can be used for all sets of contact elements which have a sufficient design height.

BRIEF DESCRIPTION OF THE DRAWINGS

The invention will be described in relation to the drawings in which:

FIG. 1 is a schematic and isometric view of a set of contact elements of the invention;

FIG. 2 is an isometric representation of a reading contact element for a set of contact elements of the invention;

FIG. 3 is an isometric representation of an additional or switching contact element;

FIG. 4 is a detail of FIG. 3;

FIG. 8 is a 10 times enlargement of the detail of FIG. 6 with the contact elements being assembled;

FIG. 9 is a sectional view along line 9—9 in FIG. 8; and

FIG. 10 is a schematic sectional view of the contact ends of the ground contact element and the additional contact element showing the two corrugations which cross each other.

FIGS. 1 through 10 relate to an embodiment of a set of contact elements 10 comprising an insulating body 11 supporting a plurality of contact elements 12. The contact elements 12 are preferably of identical design.

Figure 5:
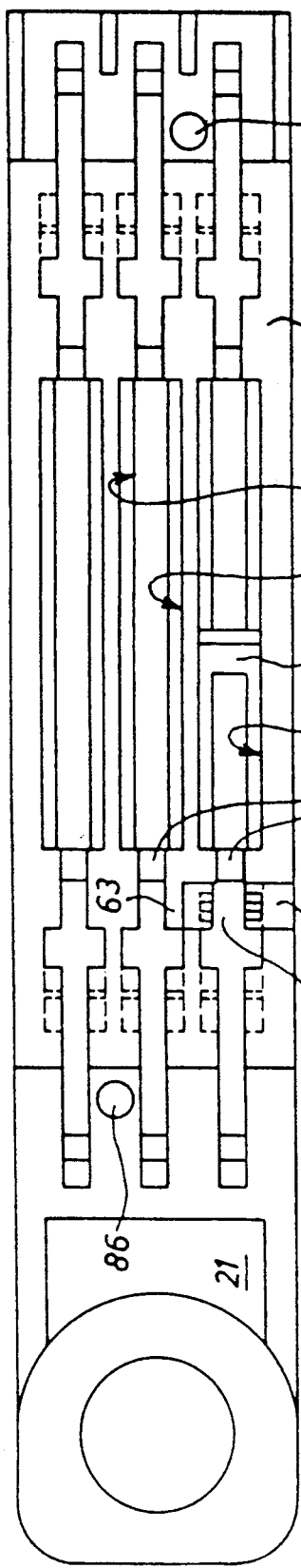
FIG. 5 is a bottom view of the set of contact elements of FIG. 1.

The set of contact elements 10 (i.e. its insulating body 11) can be mounted to the circuit board of an apparatus 17 for instance by screws. The bottom surface 21 of the set of contact elements 10 is then in abutment with the circuit board of the apparatus, while the upper surface 20 of the set 10 serves as a support for a card 18 having contact zones or so-called card contacts 16. Preferably, the card 18 is a SIM-card and, for reasons of simplification, below only the term SIM-card is used, even though any chip card can be similarly used.

When the SIM-card 18 is properly placed on the set of contact elements 10, then the bottom surface of the card 18 having the card contacts 16 comes into contact engagement with the contact elements 12 which extend beyond the upper surface 20 of the set of contact elements 10. A cover 19 is preferably used for pressing the SIM-card 18 against the upper surface 20 and thus against the contact regions (cusps) of the contact elements 12 which will be pushed inwardly.

CONTACT ELEMENTS

The contact elements 12 shown in FIG. 1 are frequently referred to as reading contact elements (reading contacts) 13. There is one reading contact element also called a ground contact element (ground contact) 14, which is normally contacted to ground. For the arrangement of FIG. 1 the contact element 12 shown in the upper left corner is the ground contact element 14, while the five remaining contact elements 12 are reading contact elements (reading contacts) 13.

The present invention relates in particular to the design of a card presence switch (CP-switch) 40 in the insulating body 11. The CP-switch 40 comprises a) one of the reading contacts 12, preferably the reading contact element which is used as a ground contact element 14, and b) a switching or additional contact element 15 as is shown in FIGS. 3 and 8.

FIG. 2 shows the contact element 12 which is used to form the identical reading contact elements 13 and also the ground contact element 14, which is again identical to the reading contact elements 13. The contact element 12 is stamped from a sheet of metal and is then bent into the shape shown. It comprises a snapping or detent zone 41 with snapping or detent projections 42, a contacting zone 47 together with a contact cusp 43 and adjacent thereto an abutment surface 44 as well as a termination zone 45.

The additional contact element (ACE) 15 shown in FIG. 3 comprises a termination and detent (snapping) zone 50 as well as a contact zone 51. The latter has a broadened contact surface 52 as well as longitudinal corrugation 53 extending therein in axial direction. FIG. 4 shows the termination and detent zone 50 in some detail. A projection 54 can be recognized and also a detent nose 55 located upwardly with respect to the projection 54, adjacent to which an inclination 56 is provided.

THE INSULATING BODY 11

Figure 6:
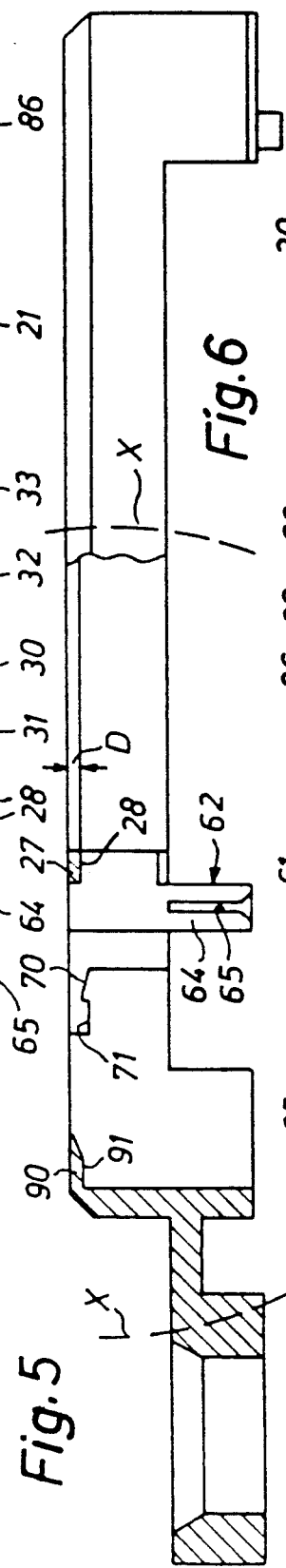
FIG. 6 is a sectional view along line 6—6 in FIG. 7.
Figure 7:
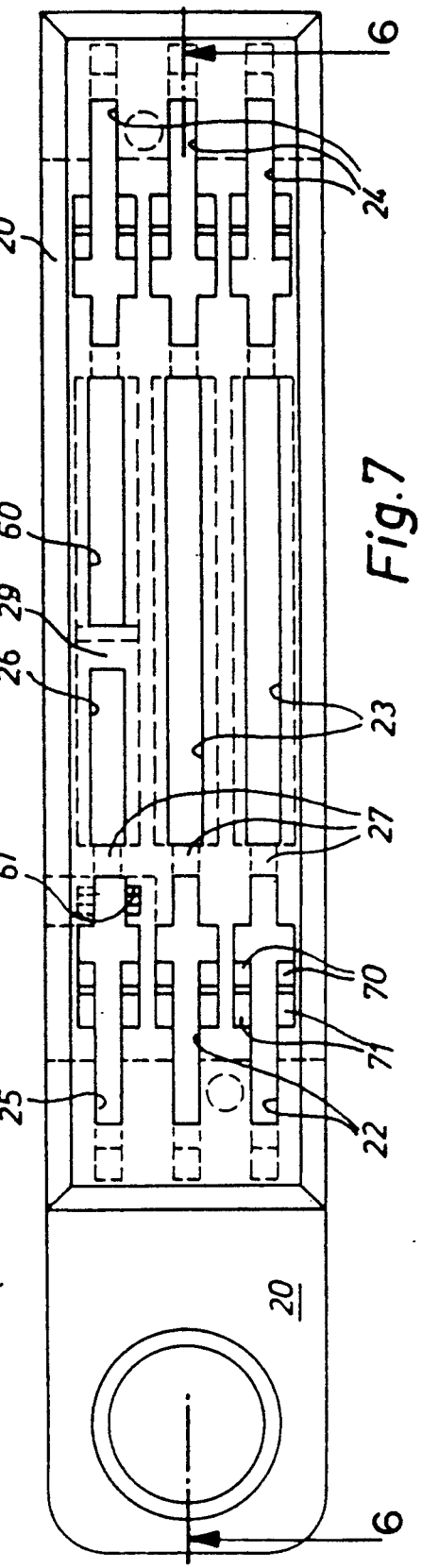
FIG. 7 is a plan view of the set of contact elements of figure

Prior to discussing the CP-switch 40 in detail, the insulating body 11 will be described by reference to FIGS. 5-7. In the lower area of the upper surface 20 shown in FIG. 7 three consecutively arranged slots 22, 23 and 24 can be seen. Likewise, the middle area shows similar slots 22, 23, and 24. The upper area, however, shows four slots: slot 25, slot 26, slot 60 and finally slot 24 which is identical to the slots 24 already mentioned. Slot 25 is modified with respect to the slots 22 by an additional recess 61. It is possible to see a support dome 62 (see also FIGS. 6 and 8) for the additional contact element 15. The two slots 26 and 60 correspond to the slot 23, they form, however, a web 29 which (as is shown in FIG. 5) forms at its lower surface an abutment surface 30 for the ground contact element 14.

The bottom surface 21 of the insulating body 11 shown in FIG. 5 is provided with three parallel chambers 31, 32 and 33 which extend in longitudal direction. Contact elements 12 of the type shown in FIG. 2 are inserted into the chambers 31, 32 and 33 and are mounted to the insulating body 11 by detent or snapping action. The detent or snapping operation is carried out by moving the contact elements 12 leftwardly, so that the detent or snapping projections 42 move along inclined surfaces 70 and snap into recesses 71, i.e. come into detent or snapping reaction therein. Thus, the contact elements 12, i.e. the reading contact elements 13 as well as the ground contact element 14 are mounted in this manner in the insulating body 11 by detent or snapping action.

In accordance with the invention the additional contact element 15 is snappingly mounted in the support dome 62. The support dome 62 is preferably of integral design with the insulating body 11 and comprises two legs 63 and 64 (see FIG. 5).

Between the two legs 63 and 64 a gap 65 is provided. As can be seen in FIG. 6, a slot 65 cuts through leg 64 and is open in downward direction. The slot 65 serves for the guidance of the termination and detent zone 50 of the additional contact element 15. The other leg 63 is, as can be seen in FIG. 9, of resilient design and forms an abutment surface 66. Due to the resiliency of the leg 63 and due to cooperation between the inclination 66 of the additional contact element 50 and the inclined surface 67 formed on the leg 64, the ground contact element 14 can reach its support or holding position when the additional contact element 50 is in its support or holding position. Thus, it is impossible that the additional contact element 50 drops out of this position due to the cooperation of the support surface 66 with the declining inclination 56. Preferably, the leg 63 comprises also a guide groove for the termination and detent zone 50. However, the guide groove is closed towards the bottom.

THE CP-SWITCH MEANS 40

Preferably, the so-called reading contact elements 13 are biased due to their abutment at abutment surfaces 28 such, that their contact regions in the form of contact cusps 43 extend beyond the upper surface 20. The contact element 12 which is used as the ground contact element 14 is also biased, but not by abutment at an abutment surface 28, but by abutment at the web 29 which forms an abutment surface 30. Due to this arrangement, the cusp 43 of the ground contact element 14 extends by a smaller distance, i.e. a smaller amount beyond the upper surface 20 as is true for the reading contact element 13. This distance is referred to by "a" and assists in obtaining the desired lagging operation with regard to the actuation of the CP-switch 40.

It is clear from FIG. 8, that web 29 forms an abutment surface 80 for the contact surface 52 of the additional contact element 15. Between the abutment surface 80 and the contact bottom side 81 of the ground contact element 14 a distance "A" is provided. Only after having moved through the distance "A" the contact surface 81 engages the contact surface 52. Altogether, the CP-switch 40 is actuated with a lag of "a" plus "A".

It is further of great importance that in accordance with the invention, the abutment surface formed by a recess 71 in the insulating body 11 and an inclination 70 for the ground contact 14 are located in the chamber of the ground contact 14 on a lower level, as this is true for the contact chambers of the "regular" reading contact elements. In addition, the web portion 27 and the housing section 90 (see FIG. 6) have a greater thickness for the chamber of the ground contact as is true for the thickness D provided for a "regular" reading contact element. As a consequence of this design, the abutment surfaces 91 and 28 (see FIG. 6) for the ground contact element are elevationally lower than the respective surfaces for a reading contact element as is shown in FIG. 6. This is an advantage for the desired lagging actuation of the card presence (CP) switch 40.

FIG. 10 shows in more detail the corrugation 53 already mentioned and further the corrugation 85 at the ground contact element 14 which is arranged crosswise with respect to the corrugation 53.

It is noted, that from the bottom surface 21 of the insulating body 11 the support dome 62 extends downwardly, while, on the other hand, two guide pins 86 extend upwardly from the other surface.

We claim:

1. A set of contact elements for use with a card comprising contact zones, said set comprising:
    an insulating body (11) having an upper surface (20) and a bottom surface (21),
    reading contact elements inserted into said insulating body (11) and extending with the contact regions beyond the upper surface (20) of the insulating body (11), and
    at least one additional contact element (15) located adjacent to one of said reading contact elements so as to form together therewith a card presence switch (40), wherein the additional contact element adapted for cooperation with one of said reading contact elements is a ground contact element.

2. The set of contact elements of claim 1 wherein the contact regions of said reading contact elements are contact cusps (43).

3. The set of contact elements of claim 1 wherein said card presence switch (40) is a lagging switch, which is activated only after the contact zones of the card are contacted or engaged by the reading contact elements and one or more ground contact elements.

4. The set of contact elements of claim 1 wherein the reading contact elements and the ground contact elements are of identical design.

5. The set of contact elements of claim 1, wherein the ground contact elements is located elevationally lower than the reading contact elements due to the design of the chamber within which said ground contact element is located.

6. The set of contact elements of claim 1, wherein the ground contact element is located elevationally lower than the reading contact elements due to the design of the chamber within which said ground contact element is located.

7. The set of contact elements of claim 1 wherein the contact elements forming the card presence switch (40) are adapted to be closed in the direction in which the card is pressed against the reading contact elements.

8. The set of contact elements of claim 1 wherein said card presence switch is a switch which closes to indicate the presence of a card.

9. The set of contact elements as set forth in claim 1 wherein said card presence switch is a switch which opens to indicate the presence of a card.

10. The set of contact elements as set forth in claim 1 wherein said card is in a chip or SIM-card, and wherein the additional contact elements is located below said one reading contact element.

11. The set of contact elements of claim 10,
    wherein the ground contact element and/or the additional contact element are provided at least in the contact area, with a corrugation,
    wherein in the case of a corrugation provided in the ground contact element and a corrugation provided in the additional contact element, said corrugations extend crosswise, and
    wherein further due said corrugations a higher specific contact pressure is obtained and thus a higher degree of contact safety inasmuch as layers of foreign matter, for example, dust and the like, which might be present, are pierced during contacting.

12. The set of contact elements of claim 1 wherein said insulating body comprises contact chambers formed therein in which said reading elements are inserted.

13. The set of contact elements of claim 12 wherein said additional contact element is located in at least one of said contact chambers below said reading contact element.

14. A set of contact elements of claim 13 wherein a support surface together with its respective inclination (17) are located elevationally lower for the ground contact element (14) by means of a recess (71) provided in the chamber of the ground contact element, as is the case for the contact chambers of the "regular" reading contacts, and
    wherein a web portion (27) and a housing section (90) for the chamber of the ground contact element have a larger thickness than thickness (D) provided for a "regular" reading contact so that the abutment surfaces (91) and (28) (in FIG. 6) for the ground contact element are located elevationally lower, than this is true for the "regular" reading contacts.

15. The set of contact elements of claim 1 wherein the additional contact element is arranged such that its contact surface (52) is below the contact surface said ground contact element.

16. The set of contact elements of claim 15, wherein said ground contact element comprises an abutment surface (44) formed by an extension of the contact region of said contact element, said abutment surface (44) being adapted to cooperate with an abutment surface (30) formed by a web (29).

17. The set of contact elements of claim 1 wherein at the bottom surface (21) of the insulating body preferably integrally therewith, a support dome (62) is provided for receiving and supporting the additional contact element (15).

18. The set of contact elements of claim 17 wherein the additional contact element is biased and abuts in its biased condition at an abutment surface (80) of a web (29).

19. A set of contact elements for engaging contact zones of a SIM-card, comprising: an insulating body (11) having an upper surface (20) and a bottom surface (21), contact chambers in said insulating bodies, contact elements snappingly located in said contact chambers and biased into a position where they extend with contact cusps beyond the upper surface, an additional switching contact element (15) forming together with one of said contact elements which are adapted for engagement with said contact zones, a card presence switch, and said additional contact element (15) is arranged such that it will be actuated only after the contact elements are in contact engagement with the contact zones of the SIM-card, wherein the additional contact element adapted for cooperation with one of said reading contact elements is a ground contact element.

* * * * *